July 14, 1925.  
W. C. F. SCHRAMM ET AL  
1,545,701  
MACHINE FOR FORMING MILLING CUTTERS  
Filed May 24, 1921  
4 Sheets-Sheet 1
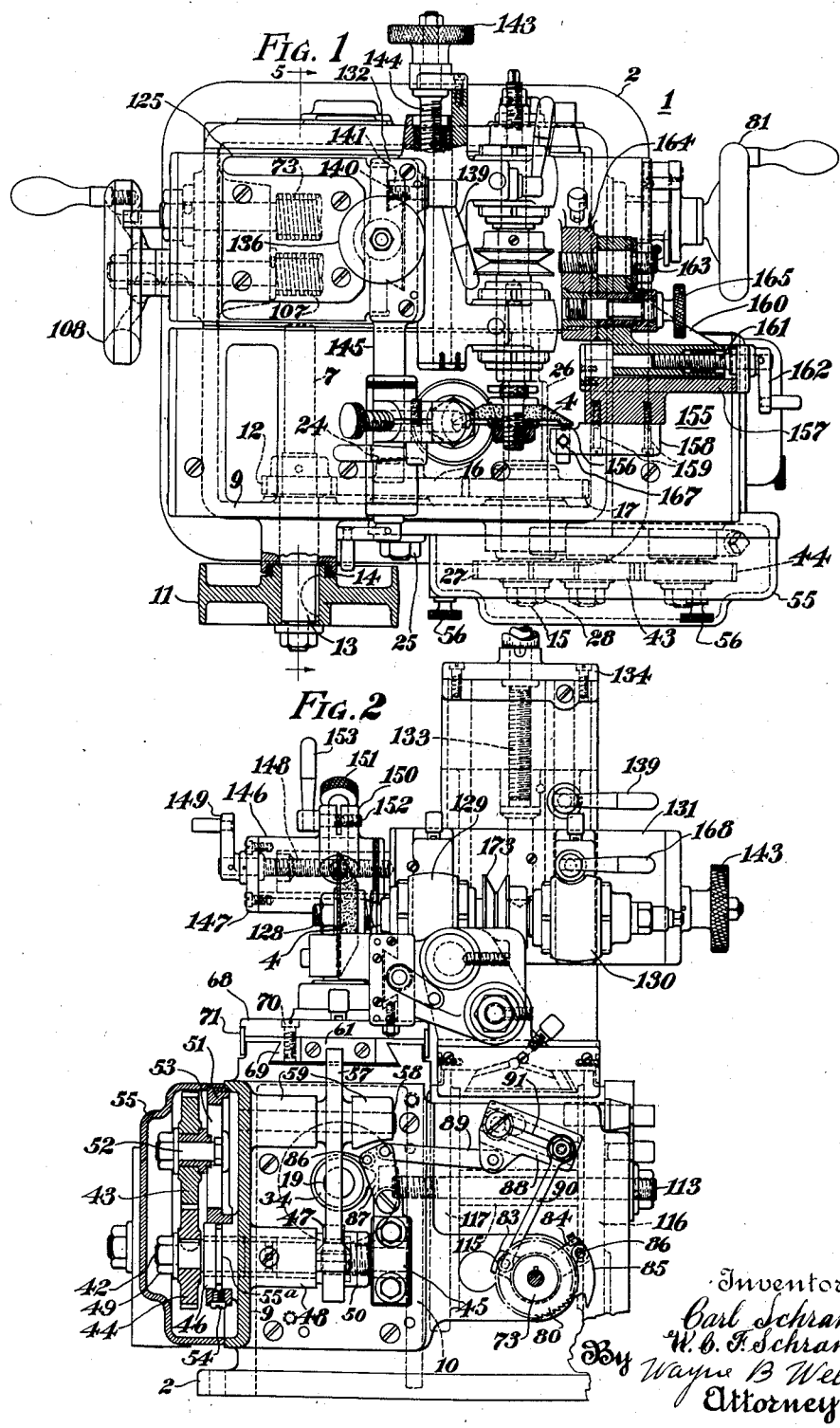

July 14, 1925.
W. C. F. SCHRAMM ET AL
1,545,701
MACHINE FOR FORMING MILLING CUTTERS
Filed May 24, 1921  4 Sheets-Sheet 3
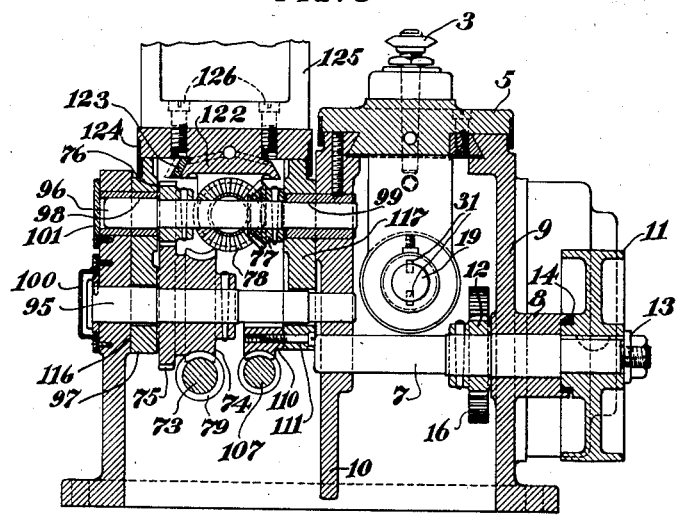
Fig. 5
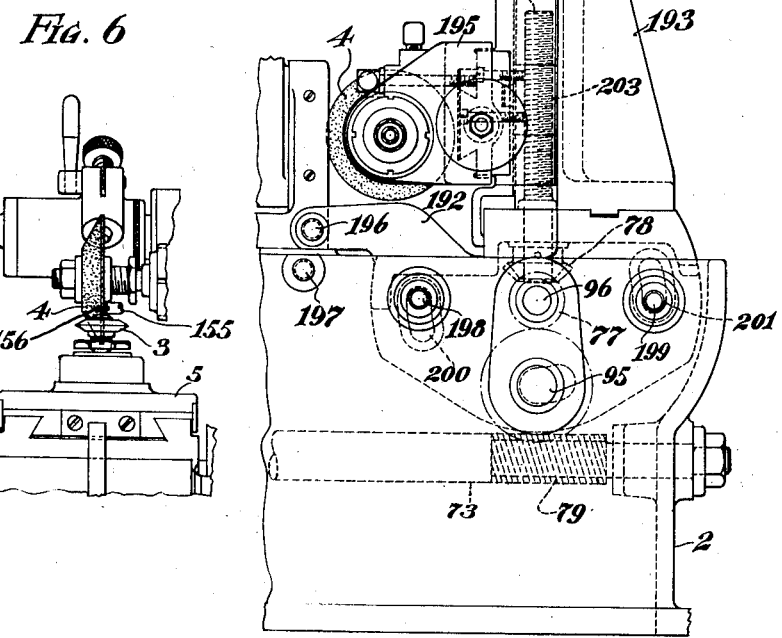
Fig. 6
Fig. 7
Inventors
Carl Schramm
W.C.F. Schramm
By Wayne B Wells
Attorney

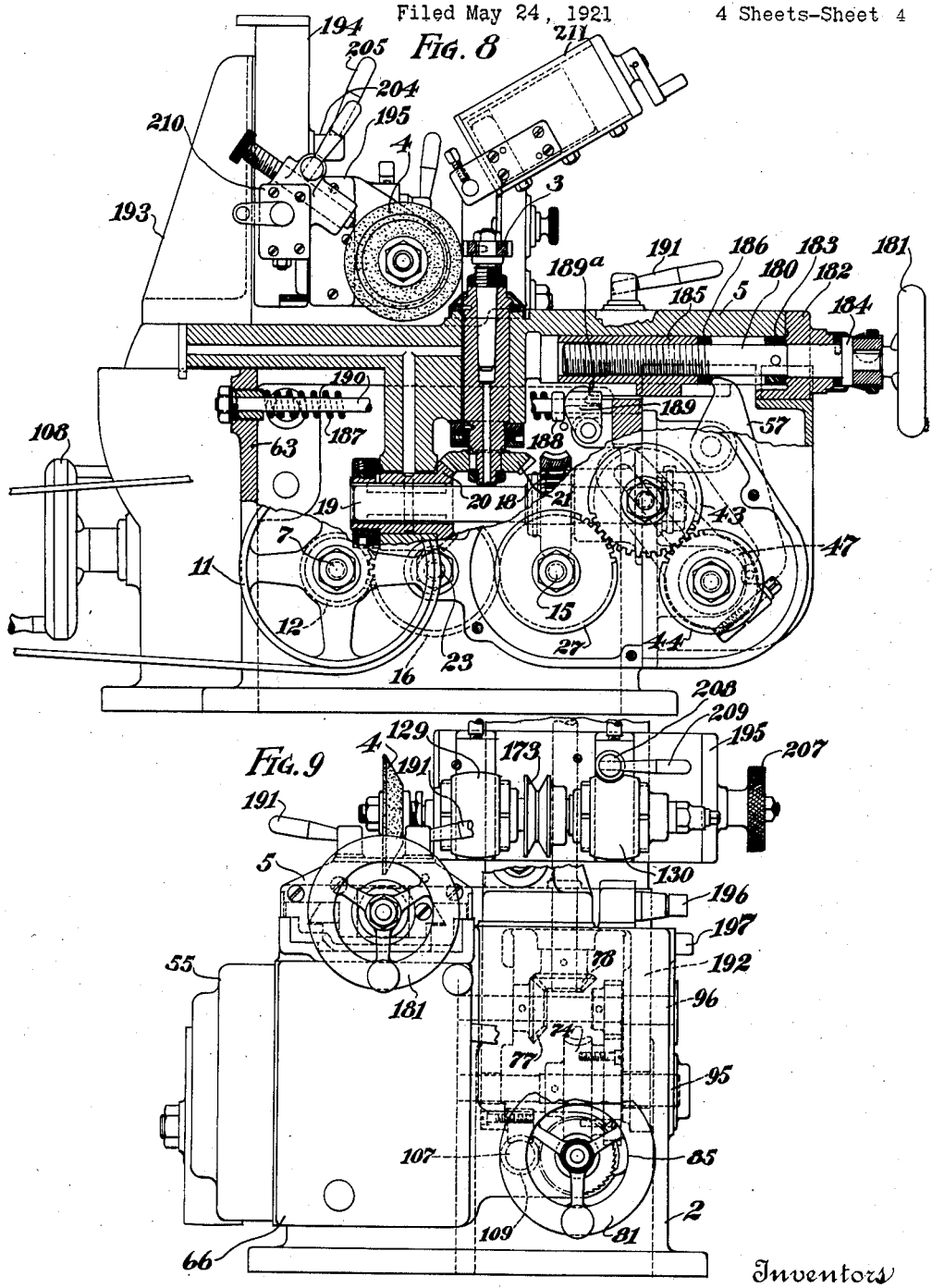

Patented July 14, 1925.

1,545,701

UNITED STATES PATENT OFFICE.

WILLIAM C. F. SCHRAMM AND CARL SCHRAMM, OF HARTFORD CONNECTICUT, ASSIGNORS TO PRATT & WHITNEY COMPANY, OF NEW YORK, N. Y., A CORPORATION OF NEW JERSEY.

MACHINE FOR FORMING MILLING CUTTERS.

Application filed May 24, 1921. Serial No. 472,033.

*To all whom it may concern:*

Be it known that we, WILLIAM C. F. SCHRAMM and CARL SCHRAMM, citizens of the United States, and residents of Hartford, in the county of Hartford and State of Connecticut, have invented certain new and useful Improvements in Machines for Forming Milling Cutters, of which the following is a specification.

Our invention relates to machines for forming milling cutters and particularly to grinding machines for forming milling cutters from blanks.

One object of our invention is to provide means that shall form a milling cutter from a blank in a simple and an efficient manner and that shall relieve the cutter teeth in such manner as to permit the sharpening of the cutter by grinding the front cutting faces of the teeth.

Another object of our invention is to provide a machine that shall rotate a grinding wheel in a plane parallel to the axis of rotation of a blank while effecting relieving movements between the blank and the wheel and while effecting feeding movements of the grinding wheel relative to the blank and that shall effect such feeding movements of the grinding wheel at any desired angle relative to the plane of rotation of the blank.

A further object of our invention is to provide a machine of the above indicated character that shall comprise a slide member for rotatably supporting a cutter blank, a second slide member for supporting a grinding wheel to effect rotation in a plane parallel to the axis of rotation of the cutter blank, a power shaft for effecting rotation of the cutter blank and for rotating a cam member to effect a relieving movement of the blank slide and the blank relative to the grinding wheel for each blank-tooth movement past the wheel, a second cam member operated by the power shaft for effecting feeding movements of the grinding wheel in timed relation to the blank rotation, and means for so adjusting the second slide as to effect the feeding movements at any desired angle relative to the plane of rotation of the blank.

In finishing a milling cutter blank in accordance with our invention, two machines are preferably used if the milling cutter is adapted to cut hobs for sharp V-threads and three machines are preferably used if the finished cutter is adapted to cut hobs for standard threads. The two machines which are used to form a cutter to cut hobs for sharp V-threads and the three machines which are used to form a cutter for cutting hobs for the standard threads are very similar in construction and perform somewhat similar functions. Two of the machines serve to grind and relieve opposite faces of the cutter teeth and the third machine serves to grind and relieve the peripheral face of the cutter teeth. The same movements are effected in each machine but in each case the grinding wheel is differently placed with respect to the cutter blank.

The blank, before being finished in a machine or machines constructed in accordance with our invention, is fluted in any suitable milling machine and the teeth thus formed are relieved in the usual manner in a lathe. The blank is then hardened and tempered. The hardened and tempered blank is rotatably mounted on a slide which is preferably adapted to effect movement in a horizontal plane. A grinding wheel is rotatably mounted on a second slide and is adapted to rotate in a plane perpendicularly located to the plane of rotation of the blank. The second slide, which carries the grinding wheel, is so mounted that it may be moved at any desired angle relative to the plane of rotation of the blank. The second slide is set to cut the teeth of the blank to any predetermined angle.

Preferably in a machine constructed in accordance with our invention, the second slide is set to any predetermined angle by determining the sine of such angle and setting the slide in accordance with the predetermined sine. A point is fixed on the slide a predetermined distance from the axis of rotation of the slide and a similar point, which is located the same distance from the axis of rotation of the slide, is fixed on the frame of a machine below the first fixed point. The sine of any angle to which the slide is set is easily determined by measuring the distance between the two fixed points, taking half of such distance and dividing it by the distance between either fixed point and the axis of rotation of the slide. In such manner, the angle to which the slide is set may be readily checked.

A gearing connection is provided for so connecting the blank to a power shaft as to permit reciprocating movement of the blank and the slide carrying it relative to the power shaft and the frame of the machine. A cam member, which is rotated by the power shaft, serves to effect relieving movements of the first slide and the blank relative to the grinding wheel and in timed relation to the blank rotation. Preferably, an adjustable gearing system is provided between such cam member and the power shaft. The cam member is set to effect a relieving movement of the blank for each tooth movement past the grinding wheel.

A second cam member, which is operated by the power shaft, serves to effect feeding movements of the second slide and the grinding wheel relative to the blank. Such feeding movements are effected in timed relation to the blank rotation. Preferably, a feeding movement is effected for each rotation of the blank. Means, which acts perpendicularly and parallelly to the direction of movement of the second slide, is provided for moving the grinding wheel into engagement with the blank.

The grinding wheel is so placed relative to the blank that the front face of the wheel is radially disposed with respect to the blank. Moreover, the blank is so rotated relative to the grinding wheel that the front face of the wheel effects the finishing cut on the teeth of the blank.

In the first machine, as above set forth, a relieving movement is effected for each tooth movement past the grinding wheel and a feeding movement of the wheel is effected for each rotation of the blank.

The second machine, which finishes and relieves the opposite sides of the teeth of the blank, is similar to the first machine with the exception that the blank is rotated in an opposite direction and the grinding wheel and the truing means are oppositely placed. The third machine serves to grind and relieve the teeth along the peripheral face of the blank when cutters are being formed to cut hobs for the U. S. standard thread. In such third machine, the slide which carries the grinding wheel is generally fixed in a vertical position. Thus, the grinding wheel is fed perpendicularly to the plane of rotation of the blank. However, such slide may be adjusted to cut the peripheral face of the blank to any desired angle as when a spiral hob is to be made. The slide which carries the blank is provided with manual means for adjusting the blank relative to the grinding wheel.

Heretofore it has been proposed to grind the sides of a milling cutter by means of a pencil grinding wheel. However, such method has been found unsatisfactory inasmuch as it is impossible to properly relieve the teeth. Moreover, it is difficult to maintain the pencil grinding wheels in working condition.

Although we have described our invention by means of machines having grinding wheels operating on cutter blanks, it is apparent that the grinding wheels may be replaced by milling cutters if so desired. Moreover, it is apparent that one machine may be varied to perform more than one operation on the cutter blank. The first machine may be provided with means for truing the face of the grinding wheel when reversed to finish the opposite sides of the teeth.

In the application of William C. F. Schramm Serial No. 472,080 filed May 24, 1921 is broadly disclosed and claimed processes for forming milling cutters such as are formed by the machines disclosed in this application.

In the accompanying drawings:

Figure 1 is a plan view of a machine constructed in accordance with our invention.

Fig. 2 is a front elevational view of the machine partially in section and one front cover removed.

Fig. 5 is a sectional view along the line 5—5 of Fig. 1.

Fig. 6 is a diagrammatic view of a modified machine wherein the position of the grinding wheel is reversed.

Fig. 7 is a view showing the arrangement of gear wheels for operating the grinding-wheel slide in a modified machine for grinding the peripheral face of the blank.

Fig. 8 is a side elevational view, partially in section, of the machine shown in Fig. 7.

Fig. 9 is a partial front elevational view of the modified machine for grinding the peripheral face of the blank.

Figure 3:
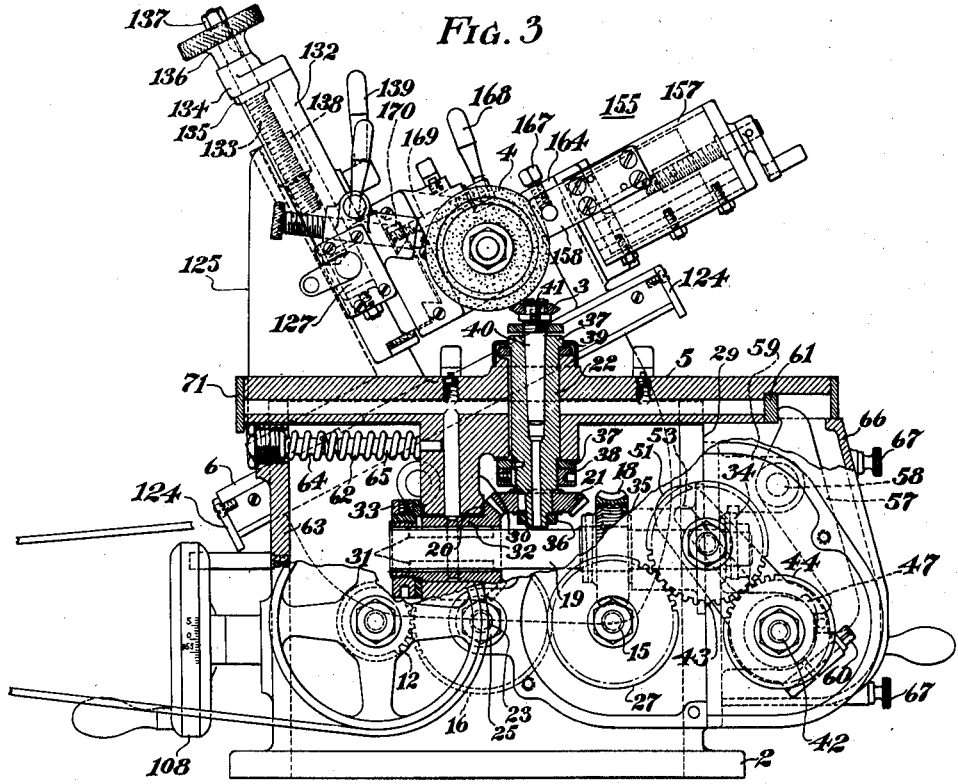
Fig. 3 is a side elevational view partially in section and looking towards the right of the machine as shown in Fig. 2 of the drawings.

Referring to Figs. 1 to 5 inclusive, a grinding machine 1 is shown for grinding and relieving the side faces of a cutter adapted to cut hobs for either U. S. standard or sharp V-threads. The machine 1 comprises a frame 2 which carries a blank milling cutter 3, which preferably rotates in a horizontal plane, and a grinding wheel 4 which preferably rotates in a vertical plane. The blank 3 is rotatably mounted on a slide 5 and the grinding wheel 4 is rotatably mounted on a slide 6. The slide 5, which carries the blank 3, effects relieving movements of the blank relative to the grinding wheel and the slide 6. The slide 6, which carries the grinding wheel, effects feeding movements of the grinding wheel relative to the blank. The blank effects a relieving movement for each blank-tooth movement past the grinding wheel and, preferably, the grinding wheel effects a feeding movement for each rotation of the blank.

A power shaft 7, having a bearing 8 in the side 9 of the frame 2 and a second bearing in a wall 10, is connected to any suitable source of power through a pulley 11. The shaft 7 serves not only to rotate the cutter blank 3 but also supplies power to effect the feeding and relieving movements of the blank and grinding wheel relative to each other. A gear wheel 12 is pinned to the power shaft 7 on one side of the bearing 8 and the pulley 11 is keyed to the power shaft on the opposite side of the bearing 8. A nut 13 is provided for holding the pulley 11 in position on the shaft. By so connecting the gear wheel 12 and the pulley 11 to the power shaft 7, longitudinal movement of the shaft in its bearings is prevented. A felt washer 14 is provided between the pulley 11 and the bearing 8 to prevent any of the grinding-wheel dust from destroying the bearing surfaces.

The gear wheel 12 is connected to a worm shaft 15 by means of gear wheels 16 and 17, and the worm shaft 15 is connected to the blank 3 by means of a worm wheel 18, a shaft 19, beveled gear wheels 20 and 21 and a spindle 22. The gear wheel 16 which meshes with the gear wheels 12 and 17, is mounted on a shaft 23. The shaft 23 is supported in the side 9 of the frame 2 and is provided with a collar 24 which holds the gear wheel 16 in position. A nut 25 is attached to the shaft 23 outside of the wall 9 for preventing axial movement of the shaft. The worm shaft 15 not only carries the gear wheel 17 and a worm member 26 but also carries a gear wheel 27 which is located on the opposite side of the wall 9 to the gear wheel 17. The worm shaft 15 is provided with bearings in the walls 9 and 10 of the frame 2 in the same manner as the power shaft 7. The gear wheel 17 is pinned to the shaft 15. The gear wheel 27 is keyed to the worm shaft on the opposite side of the wall 9 and is held in position by a bolt 28. Such construction prevents axial movement of the shaft. The worm wheel 18, which meshes with the worm member 26, is pinned to the shaft 19. The shaft 19 is provided with one bearing in the front wall 29 of the frame 2 of the machine and a second bearing is provided in a projecting portion 30 from the slide 5. The bevel gear wheel 20 is so attached to the shaft 19 by means of key members 31 that it can slide along the shaft with the slide 5. The gear wheel 20 is provided with a cylindrical portion 32 which projects through the portion 30 of the slide 5. A nut 33 is attached to the cylindrical portion 32 of the bevel gear wheel adjacent to the projection 33 for compelling such gear wheel to follow the movements of the slide 5. A cam member 34 is mounted on the shaft 19 on the opposite side of the wall 29 to the worm gear wheel 18. The worm gear wheel 18 is located adjacent to a lug 35 projecting from the wall 29, and the cam member 34 is keyed to the shaft adjacent to the wall. By so disposing the cam member and the worm gear wheel, axial movement of the shaft 19 is prevented. The cam member 34 serves to effect feeding movements of the grinding wheel 4 in a manner to be hereinafter set forth.

The bevel gear wheel 21, which meshes with the bevel gear wheel 20, is keyed to the spindle 22 and is held in position thereon by means of a nut 36. The spindle 22 has a bearing in the slide 5 and is held in position by means of a collar 37 and a nut 38. A cover or cap member 39 is provided for protecting the bearing of the spindle 22 in the slide 5 against any dust from the grinding wheel 4. A pin 40, which is mounted in the spindle 22 in the usual manner, carries the cutter blank 3. The cutter blank is maintained in position on the pin 40 by means of a screw 41.

The gear wheel 27, which is mounted on the worm shaft 15, is connected to a cam shaft 42 by means of gear wheels 43 and 44. The cam shaft 42 is provided with one bearing in the side wall 9 of the frame 2 of the machine and a second bearing in a lug 45 which projects from the end wall 29 of the frame. The gear wheel 44 is keyed to the cam shaft 42 adjacent to a lug 46 which projects from the side wall 9. A cam member 47 is keyed to the shaft 42 adjacent to a similar lug 48 which projects from the opposite side of the wall 9. Nuts 49 and 50 are mounted on the shaft 42 adjacent to the gear wheel 44 and the cam member 47 for holding such members in position on the shaft and also for preventing axial movement of the shaft. A bracket 51 is rotatably supported on the lug 46 which projects from the wall 9. The bracket 51 carries a stud shaft 52, which in turn carries the gear wheel 43. The shaft 52 is supported in a slot 53 formed in the bracket 51 and by said means may be adjusted to accommodate gear wheels of different sizes. The bracket 51 is held in position on the lug 46 by means of set screws 54 which project into a groove 55ª formed in the lug 46. The set screws 54 prevent the displacement of the bracket relative to the lug, and a bolt 60, which passes through bifurcated end portions of the bracket, serves to hold the frame in any set rotative position. A cover 55, which is held in position by means of screws 56, is provided for protecting the gear wheels 27, 43 and 44 against any dust from the grinding wheel 4.

A lever 57, which is mounted on a shaft 58, is operated by the cam member 47 for effecting relieving movements of the slide 5 and the cutter blank 3. The shaft 58 is provided with bearings in lugs 59 which project from the walls of the frame 2. The lever 57 is mounted on the shaft between such lugs, as shown in Fig. 2 of the drawings. One end of the lever 57 is engaged by the cam member 47 and the opposite end of the lever engages a plate 61 which is mounted on the slide 5. The slide 5 is moved in one direction by means of the cam member 47 and the lever 57. A spring member 62 is provided not only for returning the slide to initial position but also for holding the slide in engagement with the lever 57. The spring member 62 is located between the rear wall 63 of the frame of the machine and the projecting portion 30 from the slide 5. The spring member is mounted on pins 64 and 65 which respectively project from the wall 63 and the portion 30 of the slide. The pin 64 is provided with an enlarged head which is threadedly connected to the wall 63 in order to adjust the tension of spring member. The cam member 47 and the lever 57 serve to effect a relieving movement of the blank 3 for each tooth movement of the blank past the grinding wheel. A cover 66, which is attached to the wall 29 by means of bolts 67, is provided for covering the cam members 47 and 34 and for protecting such members against any dust from the grinding wheel 4. The slide 5 comprises a top plate 68 and a bottom plate 69, which is connected to the top plate by means of screw members 70. The bottom plate is dovetailed to the top of the frame 2 of the machine. Side and end plates 71 are provided for guarding the bearing surfaces of the slide against any dust from the grinding wheel 4.

Figure 4:
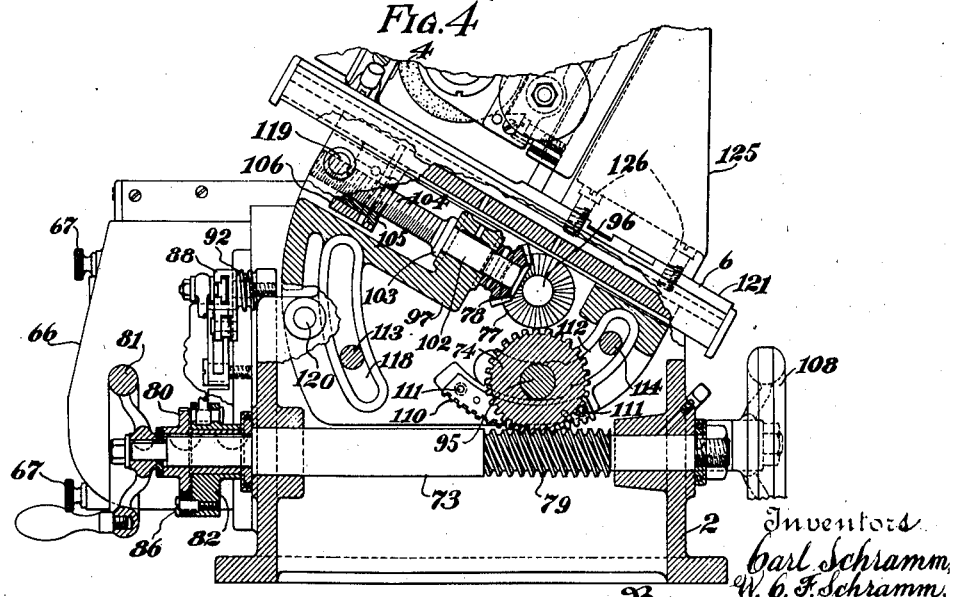
Fig. 4 is a side elevational view partially in section and looking towards the left of the machine as shown in Fig. 2 of the drawings.

The cam member 34, which is mounted on the shaft 19, effects rotative movement of the shaft 73 in timed relation to the rotation of the cutter blank 3. The shaft 73 operates a worm wheel 74, a gear wheel 75, a pinion 76 and bevel gear wheels 77 and 78 for effecting feeding movements of the slide 6 and the grinding wheel 4. The shaft 73 has bearings in the front and rear walls of the frame 2 and not only carries a worm member 79, which meshes with the worm wheel 74, but also carries a ratchet wheel 80, which is keyed to the shaft. The ratchet wheel 80 is disposed outside the front wall of the frame. A hand wheel 81 is mounted on the shaft 73 adjacent to the ratchet wheel 80 for effecting feeding movements of the grinding wheel 4 at will. A collar member 82 is rotatably mounted on a cylindrical projection from the ratchet wheel 80 as shown in Fig. 4 of the drawings. The collar member 82 carries two lugs 83 and 84. The lug 84 pivotally supports a pawl member 85 by means of a pin 86. The pawl 85 is so located as to engage the teeth of the ratchet wheel 80.

The cam member 34 engages a pin 86 projecting from a pivotally mounted lever 87 and effects a movement of the lever in accordance with the rotation of the cutter blank 3. The lever 87 is connected to a link member 88 by means of a lever 89. The link member 88 is pivotally mounted on the front wall of the frame of the machine and is connected to the lug 83 of the collar member 82 by means of a rod 90. The link member 88 is provided with a slot 91 along which the rod 90 may be adjusted to vary the feeding movement effected for each rotation of the blank 3. Upon each rotation of the cam member 34 in a counter-clockwise direction, the lever 87 is given a movement of rotation in a clockwise direction. Such movement of the lever 87 effects movement of the link member 88 in a clockwise direction and the pawl 85 and collar member 82 are in turn operated to effect rotative movement of the shaft 73. A spring member 92, which is connected to the link member 88, is provided for returning the various links and levers and the pawl member 85 to initial position for the next feeding movement. As above set forth, the amount of each feeding movement is determined by adjusting the connection of the rod 90 to the link member 88.

The worm gear wheel 74, which meshes with the worm member 79, is preferably formed integral with the gear wheel 75 and is pinned to a shaft 95. The shaft 95 is provided with bearings in the wall 10 and the side wall of the frame 2. The pinion 76, which meshes with the gear wheel 75, is mounted on and is pinned to a shaft 96 which has bearings in the walls of the frame 2 similar to the bearings provided for the shaft 95. The bevel gear wheel 77, which meshes with the bevel gear wheel 78, is also mounted on and pinned to the shaft 96. The shaft 96 not only supports the pinion 76 and the bevel gear wheel 77 but also rotatably supports a frame 97. The frame 97 carries the slide 6 and the grinding wheel 4. Bushings 98 and 99 are provided on the shaft 96 for supporting the frame 97. Any suitable covers or caps 100 or 101 are provided for respectively covering the ends of the shafts 95 and 96 to prevent the admission of any dust from the grinding wheel 4 to the bearings of such shafts.

The bevel gear wheel 78 is carried by a shaft 102 which is rotatably mounted on the frame 97, as shown in Fig. 4 of the drawings. The shaft 102 is guarded against any axial movement by means of the gear wheel 78 which is pinned to it and a collar member 103. Adjacent to the collar member 103 the shaft 102 is provided with a threaded portion 104 which cooperates with a nut 105. The nut 105 is rigidly mounted in a projecting portion 106 from the slide 6. By such connection it is apparent that any rotation of the shaft 102 effects movement of the slide 6 and the grinding wheel 4 along the frame 97.

The shaft 107, which has bearings in the front and rear walls of the frame 2, is rotated by means of a hand wheel 108 for varying the angular position of the slide 6 relative to the plane of rotation of the cutter blank 3. The shaft 107 is provided with a worm threaded portion 109 which engages a worm sector 110. The worm sector 110 is mounted on the frame 97 and is attached to it by any suitable screws 111. Upon operating the hand wheel 108, it is apparent the frame 97 and the slide 6 are rotated on the shaft 96. The frame 97 is provided with arcated slots 112 for permitting rotative movement of the frame without any interference from the shaft 95. Two bolts 113 and 114 are provided for locking the frame 97 in any set position. Each of said bolts is threadedly connected to the wall 10 of the frame and are provided with nuts and washers which are located beyond the outside of wall of the frame 2. A sleeve member 115 surrounds each bolt and is located between the two sides 116 and 117 of the frame 97. Upon operating the nuts on the ends of the bolts 113 and 114, it is apparent the sides 116 and 117 of the frame 97 are held in set position between the walls of the frame 2. The bolt 114 is located in the arcated slots 112 and the bolt 113 is located in similar arcated slots 118.

A pin 119 is mounted on the frame 97 a fixed distance from the axis of the shaft 96 and a similar pin 120 is mounted on the main frame 2 of the machine a like distance from the axis of the shaft 96. The sine of any angle to which the slide 6 is adjusted may be readily determined by measuring the distance between the pins 119 and 120 and dividing half of such distance by the distance between the axis of the shaft 96 and either of the pins.

The slide 6 comprises a plate 121, which is provided with a section 122 that is dovetailed to the frame 97. A suitable gib member 123 is provided for cooperating with the slide and the frame. Side and end plates 124 are provided for protecting the bearing portions of the slide against any dust from the grinding wheel 4.

A bracket 125 is mounted on the slide 6 and is attached to the plate 121 by any suitable screws 126. The bracket 125 supports the grinding wheel 4. The bracket 125 also carries means for adjusting the grinding wheel 4 perpendicularly and parallelly to the slide 6. The grinding wheel 4 is mounted on a shaft 128 having bearings 129 and 130 on a slide 131. A pulley 173 for operating the shaft 128 is located between the bearings 129 and 130. The slide 131 is mounted on a second slide 132. The slide 131 serves to adjust the grinding wheel 4 parallelly to the slide 6 whereas the slide 132 serves to adjust the grinding wheel 4 perpendicularly to the slide 6.

A shaft 133 projects through a lug 134 on the end of the slide 132 and is held against axial movement through said lug by means of a collar 135 and a thumb nut 136 which is keyed to the shaft 133. A nut 137 is provided on the end of the shaft for holding the thumb nut 136 in engagement with the lug 134. The lower portion of the shaft 133 threadably engages a lug 138 which projects from the bracket 125 as shown in Fig. 3 of the drawings. The slide 132 is connected to the bracket 125 by a dovetailed connection, as shown in Fig. 1 of the drawings, and a lever 139 is provided for operating a set screw 140 to lock the slide in any set position. The screw 140 engages a gib member 141, as shown in Fig. 1 of the drawings, for binding the slide to the bracket to prevent movement of the slide. From the above description, it is apparent, when the lever 139 is turned to loosen the slide 132 from the bracket 125, the thumb nut 136 may be operated to adjust the grinding wheel 4 in a vertical plane relative to the cutter blank 3.

The slide 131 is adjusted in a similar manner by means of a thumb nut 143. The thumb nut 143 serves to adjust the grinding wheel 4 in a horizontal plane relative to the cutter blank 3. The thumb nut 143 operates a shaft 144 in the same manner as the thumb nut 136 operates the shaft 133 and further description thereof is deemed unnecessary. The connection of the shaft 144 with the slide is shown in Fig. 1 of the drawings.

A device 127 for truing the peripheral face of the grinding wheel is mounted on an arm 145 which projects from the side of the slide 132. The device comprises a rectangular member 146 which is fitted to the arm 145 projecting from the slide 132. A plate 147 is attached to the end of the member 146 by means of any suitable screws. A small shaft 148, which is threadably connected to the arm 145, extends through the plate 147 and is connected to such plate by means of a collar and a bell-crank lever 149. The bell-crank lever 149 is pinned to the shaft 148 and serves to effect movement of the member 146 relative to the arm 145. A lug 150, which projects from the member 146, carries a screw 151 which in turn carries a diamond for truing the peripheral face of the grinding wheel 4. The screw 151 is locked in any set position by a set screw 152 which is operated by a lever 153. The diamond for truing the peripheral face of the grinding wheel is moved toward the wheel by means of the screw 151, and the shaft 148, which is operated by the bell-crank lever 149, serves to move the diamond across the peripheral face of the wheel.

A truing device 155 operates a diamond 156 which is mounted on a slide 157. The diamond 156 is carried by a pin projecting through a block 158. The block 158 is attached to the slide by suitable screws 159. The slide 157 is mounted on a bracket 160 and is moved along such bracket by means of a screw shaft 161 which is operated by a bell-crank lever 162. The screw shaft 161 is threadably connected to the bracket 160 in any suitable manner and is connected to the slide 157 by a collar portion and the bell-crank lever 162. The diamond 156 is moved along the front face of the grinding wheel by operating the bell-crank lever 162. The diamond 156 should be adjusted to operate in a plane radial to the milling cutter blank 3. The bracket 160 is pivotally mounted on a stud bolt 163. The stud bolt 163 is supported in a lug 164 which projects from the slide 6. A set screw 165, which projects through the bracket 160, engages the lug 164 and holds the diamond in set position. A set screw 167 is provided for holding the pin that carries the diamond 156 in any set position.

A lever 168, which operates a set screw 169, is provided for locking the slide 131 in any set position. The set screw 169 threadably engages a gib member 170, as shown in Fig. 2 of the drawings, and serves to bind the slide 131 against the slide 132.

A machine constructed as above set forth, serves to grind and relieve one side of the teeth of the cutter blank. In the machine disclosed in Figs. 1 to 5, inclusive, of the drawings, the cutter blank 3 is assumed to be rotating in a clockwise direction in order to have the front face of the grinding wheel last to engage each tooth of the cutter blank. Assuming the grinding wheel 4 to be adjusted by the thumb nuts 136 and 143 to engage the outside edge of the cutter blank, the machine will automatically operate to grind and relieve each tooth. The cutter blank 3 being rotated in engagement with the rotating grinding wheel 4 effects a relieving movement for each movement of a tooth past the grinding wheel. The relieving movements, as heretofore set forth, are effected by means of the cam member 47. Upon each rotation of the cutter blank 3, the cam member 34 effects a feeding movement of the grinding wheel 4 along the slide 6. The slide 6 is assumed to be set to whatever angle it is desired to grind the teeth of the cutter blank.

The machine which grinds and relieves the opposite face of the cutter blank is similar in construction and operation to the machine disclosed in Figs. 1 to 5, inclusive, of the drawings. The cutter blank in the second machine should be rotated in a reverse direction and accordingly the position of the grinding wheel should be reversed. Such reversal in the position of the grinding wheel necessitates the reversing of the position of the truing means 155. Referring to Fig. 6, the position of the grinding wheel 4 relative to the blank 3 is shown diagrammatically. Moreover, the position of the diamond 156 for the truing means 155 is shown in such view. In the machine shown in Fig. 6, like reference characters have been used to designate similar parts to those shown in the machine illustrated in Figs. 1 to 5, inclusive.

Referring to Figs. 7 to 9, inclusive, a modified machine is shown for grinding and relieving the peripheral faces of the teeth when U. S. standard thread hobs are to be cut by the finished cutter. The machine shown in Figs. 7 to 9, inclusive, is very similar in construction to the machine shown in Figs. 1 to 5, inclusive, and like parts will be indicated by similar reference characters. In such machine, the slide 5 carries a screw shaft 180 which is controlled by means of a hand wheel 181. An end plate 182, which is attached to the end of the slide, serves to support the shaft 180. The shaft 180 is prevented from effecting any axial movement relative to the plate 182 by means of a collar member 183 which is pinned to the shaft on one side of the plate and another similar collar member 184 which is pinned to the shaft on the opposite side of the plate. The shaft 180 carries a nut 185, which is engaged by the lever 57. The lever 57, as before set forth, is operated by the cam member 47. A suitable wearing plate 186 is provided between the end of the lever 57 and the nut 185. The nut 185 and the slide 5 are held by means of a spring member 187 in such position that the nut engages the end of the lever 57. The spring member 187 is located between the wall 63 of the frame 2 and a loose collar 188 which engages a pivotally mounted lever 189. The collar 188 is loosely mounted on a rod 190 which is supported in the front and the rear wall of the frame 2. The lever 189 is held in engagement with a block 189ª which is attached to the nut 185 in any suitable manner. The tension of the spring 187 may be adjusted in the same manner as the tension of the spring member 162 is adjusted in the machine shown in Figs. 1 to 5, inclusive.

The slide 5 in the machine shown in Figs. 7 to 9, inclusive, effects relieving movements in the same manner as the slide 5 in the machine illustrated in Figs. 1 to 5, inclusive. However, in the machine shown in Figs. 7 to 9, inclusive, the hand wheel 181 may be operated for adjusting the cutter blank in a horizontal plane relative to the grinding wheel 4. The position of the cutter blank 3 is also raised somewhat above the slide 5 in order to permit the movement of the grinding wheel in a vertical plane past the cutter blank. Handles 191, which operate screws, are provided for locking the slide 5 in any set position against movement by the hand wheel 181.

A frame 192 is rotatably supported on the shaft 96 in the same manner as the frame 97 is supported on a similar shaft in the machine illustrated in Figs. 1 to 5, inclusive. The frame 192 supports a bracket 193 which in turn supports a slide 194. The slide 194 supports a second slide 195 which carries the grinding wheel 4. The angular position of the frame 192 and the slide 194 relative to the plane of rotation of the cutter blank 3 is varied by means of the shaft 107. Generally, the frame 182 is so set that the slide 194 effects a movement perpendicularly to the plane of rotation of the cutter blank. However, in case a spiral hob is to be cut, the position of the frame 192 must be so changed that the slide 194 is disposed at some predetermined angle other than a right angle to the plane of rotation of the cutter blank.

The frame 192 carries a fixed pin 196 which is located a fixed distance from the axis of rotation of the frame. A similar fixed pin 197 is located on the frame 2 of the machine below the pin 196 and at the same distance from the axis of rotation of the frame 192. By means of such pins the sine of the angle to which the frame is set is easily checked in the same manner as the position of the slide 6 is checked in the machine illustrated in Figs. 1 to 5, inclusive. Two bolts 198 and 199 serve to lock the frame 192 in any set position in the same manner as the bolts 113 and 114 serve to lock the frame 97. Slots 200 and 201 are provided in the frame 192 in order to prevent the bolts 198 and 199 from interfering with the rotative movement of the frame.

The bevel gear wheel 78, which meshes with the bevel gear wheel 77 on the shaft 96, is fixedly mounted on a screw shaft 202 which effects movement of the slide 194. A nut 203, which is attached to the slide 194 in any suitable manner, is threadably connected to the screw shaft 202. The nut 203 effects movement of the slide 194 in accordance with the rotative movement of the screw shaft 202. A set screw 204, which is operated by a handle 205, is provided for locking the slide 194 in any set position. It will be noted the slide 194 effects feeding movements of the grinding wheel 4 across the peripheral face of the cutter blank. Moreover, it will be noted such feeding movements are effected in timed relation to the rotation of the cutter blank 3.

The slide 195, which is mounted on the slide 194, supports the grinding wheel 4 in the same manner as the grinding wheel is supported on the slide 131 in the machine illustrated in Figs. 1 to 5, inclusive. The position of the slide 195 is varied by means of a thumb nut 207 in the same manner as the position of the slide 131 is varied by the thumb nut 143. A set screw 208, which is operated by a handle 209, is provided for locking the slide 195 in any set position. The slide 195 is operated by the thumb nut 207 to move the grinding wheel 4 into operative position relative to the cutter blank 3.

A truing device 210 is provided for truing the peripheral face of the grinding wheel 4. Such truing device is similar in construction to the truing device disclosed in Figs. 1 to 5, inclusive, for performing a like function and is similarly mounted on the slide 194. Another truing device 211 is provided for truing the front face of the grinding wheel. The truing device 211 is mounted on the frame 2 of the machine and is similar in construction to the truing device 155 in the machine illustrated in Figs. 1 to 5, inclusive.

In order to simplify the description of our invention, the term grinding wheel is used repeatedly throughout the specification and claims. However, it is to be understood that such term is intended to include any similar rotating tool. Moreover, the term grinding machine is intended to cover any similar machine.

Modifications in the mechanism and in the arrangement and location of parts may be made within the spirit and scope of our invention and such modifications are intended to be covered by the appended claims.

What we claim is:

1. In a machine for forming a milling cutter from a blank, the combination comprising a cutting wheel rotating in a plane perpendicular to the plane of rotation of a continuously rotating blank and in point engagement with the rotating blank, and means for relatively moving the blank and the wheel to effect a series of circumferential cuts on the teeth of the blank, each of said cuts on each tooth being in one plane parallel to the plane of the blank rotation.

2. In a machine for forming a milling cutter from a blank, the combination comprising a cutting wheel rotating in a plane perpendicular to the plane of rotation of the rotating blank, means for relatively moving the blank and the wheel to effect circumferential cuts on the teeth of the blank conforming to any predetermined angle relative to the plane of rotation of the cutter blank, each of said cuts on each tooth being in one plane parallel to the plane of the blank rotation.

3. In a machine for forming a milling cutter from a blank, the combination comprising a cutting wheel rotating in a plane perpendicular to the plane of rotation of the blank, and means for relatively moving the blank and the wheel to effect a series of circumferential cuts on the face of each tooth of the blank in side by side relation and following any predetermined relief on the teeth.

4. In a machine for forming a milling cutter from a blank, the combination comprising a cutting wheel rotating in a plane perpendicular to the plane rotation of the rotating blank, and means for relatively moving the blank and the wheel to effect a series of circumferential cuts on the teeth of the blank, said cuts separately conforming to any desired relief on the teeth and collectively conforming to any desired angle relatively to the plane of rotation of the blank.

5. In a machine for forming a milling cutter from a blank, the combination comprising a cutting wheel rotating in a plane perpendicular to the plane of rotation of the blank and in engagement with the teeth of the rotating blank, means for effecting relieving movements of the blank relative to the wheel, and means for effecting feeding movements of the wheel relatively to the blank.

6. In a machine for forming a milling cutter from a blank, the combination with a rotating spindle for supporting the blank, a cutting wheel rotated in a plane perpendicular to the plane of rotation of the blank, of means for effecting relieving movements between the blank and the wheel in conformity to the teeth on the blank, and means for effecting feeding movements between the blank and the wheel.

7. In a machine for forming a milling cutter from a blank, the combination with a rotating spindle for supporting the blank, a cutting wheel, and means for rotating the wheel on an axis in a plane located substantially perpendicularly to the plane of rotation of the blank, of means for effecting relieving movements by the blank, and means for effecting feeding movements by the wheel.

8. In a grinding machine forming a milling cutter from a blank, the combination with a rotating spindle for supporting the blank, and a grinding wheel rotating in engagement with the blank, the front face of the grinding wheel being radially disposed with respect to the blank, of means for effecting relieving movements of the blank relative to the wheel in conformity with the teeth on the blank, and means for effecting feeding movements of the grinding wheel relative to the blank and in timed relation to the rotation of the blank.

9. In a grinding machine for forming a milling cutter from a blank, the combination with a rotating spindle for supporting the blank, a grinding wheel rotating in engagement with the blank, the front face of the grinding wheel being radially disposed with respect to the blank, and means for adjusting the grinding wheel for feeding movements in accordance with the desired angle of the cutter teeth, of means for effecting relieving movements of the blank relative to the wheel in conformity with the teeth on the blank, and means for effecting feeding movements of the grinding wheel relative to the blank along the desired angle and in accordance with the rotation of the blank.

10. In a machine for forming a milling cutter from a blank, the combination with a rotating spindle or supporting the blank, a slide for supporting said spindle and the blank, a cutting wheel adapted to be rotated in engagement with the blank, a slide for supporting said wheel, and means for setting the wheel slide to effect movement along any desired angle relative to the plane of rotation of the cutter blank, of means for effecting relieving movements of the blank slide in accordance with the teeth on the bank, and means for effecting feeding movements of the wheel slide in accordance with the rotation of the blank.

11. In a machine for forming a milling cutter from a blank, the combination with a rotating spindle for supporting the blank, and a cutting wheel rotating in a plane perpendicular to the plane of rotation of the blank, of means for feeding the wheel along any desired angle with respect to the plane of rotation of the blank, and means for effecting relieving movements between the tool and the blank in comformity to the teeth on the blank.

12. In a machine for forming a milling cutter from a bank, the combination with a rotating spindle for supporting the blank, and a cutting wheel rotating in a plane perpendicular to the plane of rotation of the blank, of means for effecting a relieving movement by the blank relative to the wheel for each blank tooth movement past the wheel, and means for effecting a feeding movement of the wheel for each rotation of the cutter blank.

13. In a machine for forming a milling cutter from a blank, the combination with a rotating spindle for supporting the blank, and a grinding wheel rotating in a plane perpendicular to the plane of rotation of the blank, of means for effecting a relieving movement between the blank and the wheel for each blank tooth movement past the grinding wheel, and means for effecting a feeding movement between the blank and the wheel for each rotation of the cutter blank.

14. In a grinding machine for forming a milling cutter from a blank, the combination with a rotating spindle for supporting the blank, and a grinding wheel rotating in engagement with the blank, the front face of the grinding wheel being radially disposed with respect to the blank, of means for effecting relieving movements of the blank relative to the grinding wheel for each blank tooth movement past the grinding wheel, and for effecting a feeding movement of the grinding wheel relative to the blank along any predetermined angle for each rotation of the cutter blank.

15. In a grinding machine for forming a milling cutter from a blank, the combination comprising a rotating spindle for supporting the blank, a grinding wheel rotating in a plane perpendicular to the plane of rotation of the blank, and means for so moving the blank and the wheel relative to each other as to effect a series of grinding cuts on the teeth of the blank which conform to the desired angle of the teeth, said grinding cuts being taken along such lines as to relieve the teeth and permit the grinding of the front cutting faces of the teeth without changing the effective contour cut by the teeth.

16. In a grinding machine for forming a milling cutter from a blank, the combination comprising a slide for carrying the cutter blank, a power shaft, means for connecting the power shaft to the blank and for permitting reciprocating movement of the blank and slide relative to the power shaft, means comprising a rotating cam member for effecting relieving movements of the blank and slide in timed relation to the blank rotation, and a rotating grinding wheel cooperating with said blank.

17. In a grinding machine for forming a milling cutter from a blank, the combination with means for rotating and for effecting relieving movements by the cutter blank, of a grinding wheel rotating in engagement with the cutter blank, a slide for rotatably supporting the wheel, means for setting said slide for movement in a plane angularly disposed to a horizontal plane, and means for effecting feeding movements of the wheel and slide relative to the cutter blank.

18. In a grinding machine for forming a milling cutter from a blank, the combination with means for rotating and for effecting relieving movements by the blank, of a grinding wheel rotating in engagement with the cutter blank, a slide for supporting said wheel, means for setting the slide to effect movement in a plane located at any predetermined angle to the plane of the cutter blank, and means for effecting feeding movements of the wheel and slide in timed relation to the blank rotation.

19. In a grinding machine for forming a milling cutter from a blank, the combination with a slide for rotatably supporting the blank, a rotating grinding wheel mounted for rotation in a plane perpendicular to the plane of rotation of the cutter blank, a slide for rotatably supporting the grinding wheel, and means for setting the wheel slide for movement in a plane located at any predetermined angle to the plane of movement of the blank slide, of means comprising a power shaft for effecting rotation of the cutter blank, means comprising a cam member operated by the power shaft in timed relation to the blank rotation for effecting relieving movements of the cutter blank and the cooperating slide, and means comprising a second cam member operated by the power shaft in timed relation to the blank rotation for effecting feeding movement of the wheel and the wheel slide.

20. In a grinding machine for forming a milling cutter from a blank, the combination with a slide, a spindle rotatably mounted on said slide and carrying the cutter blank, a power shaft, and gearing connecting means between said power shaft and said spindle for rotating the blank while permitting an independent sliding movement of the slide and blank relative to the power shaft, of a rotating grinding wheel, a slide for supporting said grinding wheel, means for setting said wheel slide for movement in a plane at any desired angle relative to the plane of movement of the cutter slide, means comprising a cam member operated by the power shaft for effecting relieving movements of the blank slide in accordance with the rotation of the cutter blank, and means comprising a cam member operated in accordance with the blank rotation for effecting feeding movements of the wheel slide.

21. In a grinding machine for forming a milling cutter from a blank, the combination with means comprising a power shaft for rotating the blank, a wheel cooperating with the blank and rotating in a plane perpendicular to the plane of rotation of the blank, and a slide for supporting said wheel, of adjustable means connected to said power shaft for effecting feeding movements of the wheel and slide in timed relation to the blank rotation, said means being adjustable to feed the wheel a predetermined amount for each blank rotation.

22. In a grinding machine for forming a milling cutter from a blank, the combination with means comprising a power shaft for rotating the blank, a wheel cooperating with said blank, and a slide for supporting said wheel, of a cam member rotated by said power shaft in timed relation to the blank rotation, means comprising a pawl and a ratchet wheel operated by said cam member for feeding said wheel and the slide relative to the blank, said means being adjustable to effect feeding movements of any predetermined amount, and means for manually feeding said wheel and slide at will.

23. In a grinding machine for forming a milling cutter from a blank, the combination with means comprising a power shaft for rotating the blank, a wheel cooperating with the blank, a slide for supporting said wheel, and means for setting said slide to effect movement in a plane located at any desired angle relative to the plane of rotation of the blank, of a cam member rotated by said power shaft in timed relation to the blank rotation, means comprising a pawl and a ratchet wheel operated by said cam member for feeding said wheel and the slide relative to the blank along the angle to which the slide is set, said feeding means being adjustable to effect feeding movements of any predetermined amount, and means cooperating with the feeding means for manually feeding said wheel and slide at will.

24. In a grinding machine for forming a milling cutter from a blank, the combination with means comprising a power shaft for rotating the blank, and a grinding wheel cooperating with the blank, of means comprising a cam member rotated by said shaft for effecting a relieving movement of the blank for each tooth movement past said grinding wheel, and means comprising a second cam member rotated by said shaft for effecting a feeding movement of the wheel for each rotation of the blank.

25. In a grinding machine for forming a milling cutter from a blank, the combination with means comprising a power shaft for rotating the blank, and a grinding wheel cooperating with the blank, of means comprising a cam member for effecting a relieving movement of the blank for each tooth movement past said grinding wheel, means comprising a second cam member for effecting a feeding movement of the wheel for each rotation of the blank, and means comprising an adjustable gearing system for connecting the cam members to said power shaft.

26. In a grinding machine for forming a milling cutter from a blank, the combination comprising means for rotating the milling cutter blank, a rotatable grinding wheel cooperating with the blank, a slide for supporting said wheel, means for operating said slide in accordance with the blank rotation to feed the wheel relative to the blank, and manual means for adjusting the grinding wheel in a plane located perpendicular to and in a plane located parallel to the axis of the blank.

27. In a grinding machine for forming a milling cutter from a blank, the combination with a slide for supporting the blank, a rotatable grinding wheel cooperating with said blank, a second slide for supporting said wheel, means for operating said second slide in accordance with the blank rotation to feed the wheel relative to the blank, and means for setting the second slide to effect the feeding movement along any predetermined angle relative to the plane of rotation of the blank, of means for effecting relieving movements of the blank and the blank slide relative to the wheel, and means for adjusting the wheel on the second slide in planes located perpendicular and parallel to the axis of the blank.

28. In a grinding machine for forming a milling cutter from a blank, the combination with a rotatable grinding wheel co-operating with the cutter blank, a slide for supporting said wheel, and means for adjusting said slide in a plane perpendicular to the axis of the blank, of a second slide for supporting said first slide, means for adjusting said second slide in a plane parallel to the axis of the blank, a third slide for supporting said second slide, and means for effecting feeding movements of the third slide in timed relation to the blank rotation.

29. In a grinding machine for forming a milling cutter from a blank, the combination with a rotatable grinding wheel cooperating with the cutter blank, a slide for supporting said wheel, and means for adjusting said slide in a plane perpendicular to the axis of the blank, of a second slide for supporting said first slide, means for adjusting said second slide in a plane parallel to the axis of the blank, a third slide for supporting said second slide, means for angularly adjusting the third slide relative to the plane of rotation of the cutter blank, and means for effecting feeding movements of the third slide in timed relation to the blank rotation.

30. In a grinding machine for forming a milling cutter from a blank, the combination with a slide for rotatably supporting the cutter blank, a rotatable grinding wheel cooperating with the cutter blank, a second slide for supporting said wheel, and means for adjusting the second slide in a plane perpendicular to the axis of the blank, of a third slide for supporting said second slide, means for adjusting said third slide in a plane parallel to the axis of the blank, a fourth slide for supporting said third slide, means for effecting feeding movements of the fourth slide in timed relation to the blank rotation, and means for effecting relieving movements of the blank slide in timed relation to the blank rotation.

31. In a grinding machine for forming a milling cutter from a blank, the combination with a slide for rotatably supporting the cutter blank, a rotatable grinding wheel cooperating with the cutter blank, a second slide for supporting said wheel, and means for adjusting the second slide in a plane perpendicular to the axis of the blank, of a third slide for supporting said second slide, means for adjusting said third slide in a plane parallel to the axis of the blank, a fourth slide for supporting said third slide, means for angularly adjusting the fourth slide relative to the plane of rotation of the cutter blank, and means for effecting relieving movements of the blank slide in timed relation to the blank rotation.

32. In a grinding machine for forming a milling cutter from a blank, the combination with a slide for rotatably supporting the cutter blank, a rotatable grinding wheel cooperating with the cutter blank, a second slide for supporting said wheel, a third slide for supporting said second slide, and means for adjusting the second and the third slides to move the grinding wheel into engagement with the grinding wheel, of a fourth slide for supporting the third slide, means for adjusting the fourth slide to effect movement at any predetermined angle relative to the plane of rotation of the blank, and means comprising cam members for effecting relieving movements of the blank slide in timed relation to the blank rotation and for effecting feeding movements of the fourth slide.

33. In a grinding machine for forming a milling cutter from a blank, the combination with a slide for rotatably supporting the cutter blank, a rotatable grinding wheel cooperating with the cutter blank, a slide for supporting the grinding wheel, and means for operating the wheel slide in accordance with the blank rotation to effect feeding movement of the grinding wheel relative to the blank, of means for effecting relieving movement of the blank slide relative to the grinding wheel, and means mounted on the wheel slide for adjusting the wheel into engagement with the cutter blank.

34. In a grinding machine for forming a milling cutter from a blank, the combination with a rotatable grinding wheel cooperating with the cutter blank, and a slide for supporting said grinding wheel, of means for adjusting the wheel into engagement with the cutter blank in a plane perpendicular to and in a plane parallel to the plane of movement of said slide, and means for effecting feeding movements of said slide in timed relation to the blank rotation.

35. In a grinding machine for forming a milling cutter from a blank, the combination with a slide for supporting the cutter blank, a grinding wheel cooperating with the cutter blank, and a slide for supporting said grinding wheel, of means for adjusting the wheel into engagement with the cutter blank in a plane perpendicular to and in a plane parallel to the plane of movement of the wheel slide, means for effecting feeding movements of the wheel slide in timed relation to the blank rotation, and means for effecting relieving movements of the blank slide relative to the grinding wheel.

36. In a grinding machine for forming a milling cutter from a blank, the combination with a slide for supporting the cutter blank, a grinding wheel cooperating with the cutter blank, and a slide for supporting said grinding wheel, of means for adjusting the wheel into engagement with the cutter blank in plane perpendicular to and in a plane parallel to the plane of movement of the wheel slide, means for angularly adjusting the wheel slide relative to the plane of rotation of the blank, means for effecting a relieving movement of the blank slide for each blank-tooth movement past the grinding wheel, and means for effecting a feeding movement of the wheel slide for each rotation of the cutter blank.

37. In a grinding machine for forming a milling cutter from a blank, the combination with means comprising a power shaft for rotating the blank, and a grinding wheel cooperating with said blank, of a slide for rotatably supporting said wheel, means for rotating said slide to effect movement in a plane located at any desired angle relative to the plane of rotation of the blank, means for rigidly holding said slide in any set rotative position, means for accurately measuring the angle to which the slide is set, and means for effecting feeding movements of the wheel and slide in timed relation to the blank rotation.

38. In a grinding machine for forming a milling cutter from a blank, the combination with a main frame, means mounted on said frame for rotating the cutter blank, and a grinding wheel cooperating with said blank, of a slide for supporting said grinding wheel, an auxiliary frame for supporting said slide and pivotally mounted on said main frame, said auxilary frame being rotated to any desired position to permit movement of the slide at any desired angle relative to the plane of rotation of the blank, and means for effecting feeding movements of the slide in timed relation to the blank rotation.

39. In a grinding machine for forming a milling cutter from a blank, the combination with a main frame, means mounted on said frame for rotating the cutter blank, and a grinding wheel cooperating with said blank, of a slide for supporting said grinding wheel, an auxiliary frame for supporting said slide and pivotally mounted on said main frame, said auxiliary frame being rotated to any desired angle relative to the plane of rotation of the blank, side members projecting from said auxiliary frame and located adjacent to walls of the main frame, bolts located in the main frame and passing through arcated slots formed in said side members, and sleeves mounted on said bolts between said side members, said bolts serving to lock the side members between the sleeves and the walls of the main frame to hold the auxiliary frame in any set position.

40. In a grinding machine for forming a milling cutter from a blank, the combination with a main frame, means for rotating the cutter blank, and a grinding wheel cooperating with said blank, of a slide for supporting said grinding wheel, an auxiliary frame for supporting said slide and pivotally mounted on said main frame, said auxiliary frame being rotated to any desired position to permit movement of the slide at any desired angle relative to the plane of rotation of the blank, side members projecting from said auxiliary frame and located adjacent to walls of the main frame, bolts located in the main frame and passing through arcated slots formed in said side members, sleeves mounted on said bolts between said side members, said bolts serving to lock the side members between the sleeves and the walls of the main frame to hold the auxiliary frame in any set position, means for effecting relieving movements of the blank relative to the wheel, and means for effecting feeding movements of the wheel in timed relation to the blank rotation.

41. In a grinding machine for forming a milling cutter from a blank, the combination with a main frame, means for rotating the cutter blank, and a grinding wheel cooperating with said blank, of a slide for supporting said grinding wheel, an auxiliary frame for supporting said slide and pivotally mounted on said main frame, said auxiliary frame being rotated to any desired position to permit movement of the slide at any desired angle relative to the plane of rotation of the blank, means comprising bolts for locking the auxiliary frame in any set position, and means for effecting feeding movements of the slide in timed relation to the blank rotation.

42. In a grinding machine for forming a milling cutter from a blank, the combination with a main frame, a grinding wheel cooperating with the cutter blank, and a slide for rotatably supporting the grinding wheel, of means for varying the angular position of the wheel slide relative to the plane of rotation of the cutter blank, and two pins, one of said pins being fixedly mounted on the main frame and the other pin being so mounted as to assume a position in accordance with angular position of said slide, said pins serving as reference points to determine the sine of the angle of the wheel slide relative to the plane of rotation of the cutter blank.

43. In a grinding machine for forming a milling cutter from a blank, the combination with a main frame, a grinding wheel cooperating with the cutter blank, and a slide for rotatably supporting the grinding wheel, of means for varying the angular position of the wheel slide relative to the plane of rotation of the cutter blank, means for effecting feeding movements of the wheel slide in timed relation to the blank rotation, and two pins, one of said pins being fixedly mounted on the main frame and the other pin being so mounted as to assume a position in accordance with the angular position of said slide, said pins serving as reference points to determine the sine of the angle of the wheel slide relative to the plane of rotation of the cutter blank.

44. In a grinding machine for forming a milling cutter from a blank, the combination with a main frame, a grinding wheel cooperating with the cutter blank, a slide for rotatably supporting the grinding wheel, and an auxiliary frame pivotally mounted on the main frame and supporting said wheel slide, said auxiliary frame being moved on its axis to vary the angle between the plane of movement of the wheel slide relative to the plane of rotation of the cutter blank, of two fixed pins respectively mounted on the main and the auxiliary frame the same distance from the axis of rotation of the auxiliary frame, said pins serving as reference points to determine the sine of the angle of the wheel slide relative to the plane of rotation of the cutter blank.

45. In a grinding machine for forming a milling cutter from a blank, the combination with a main frame, a grinding wheel cooperating with the cutter blank, a slide for rotatably supporting the grinding wheel, and an auxiliary frame pivotally mounted on the main frame and supporting said wheel slide, said auxiliary frame being moved on its axis to vary the angle between the plane of movement of the wheel slide relative to the plane of rotation of the cutter blank, of two fixed pins respectively mounted on the main and the auxiliary frame the same distance from the axis of rotation of the auxiliary frame, said pins serving as reference points to determine the sine of the angle of the wheel slide relative to the plane of rotation of the cutter blank, means for effecting feeding movements of the wheel slide in timed relation to the blank rotation.

46. In a grinding machine for forming a milling cutter from a blank, the combination with a spindle for supporting the cutter blank, a slide for rotatably supporting said spindle, a main frame for supporting said blank slide, a rotating shaft on said frame having its axis parallel to the line of movement of the blank slide, and bevel gear wheels respectively mounted on said shaft and the spindle for connecting the shaft to the cutter blank, the gear wheel mounted on said shaft being keyed to the shaft to permit slidable movement thereon, of a grinding wheel cooperating with the cutter blank, and means for effecting relieving movements of the slide and blank relative to the grinding wheel.

47. In a grinding machine for forming a milling cutter from a blank, the combination with a spindle for supporting the cutter blank, a slide for rotatably supporting said spindle, a main frame for supporting said blank slide, a rotating shaft mounted on said frame with its axis parallel to the line of movement of the blank slide, and bevel gear wheels respectively mounted on said shaft and the spindle for connecting the shaft to the cutter blank, the gear wheel mounted on said shaft being keyed to the shaft to permit slidable movement thereon, of a grinding wheel cooperating with the cutter blank, means for effecting relieving movements of the slide and blank relative to the grinding wheel, and means for effecting feeding movements of the wheel relative to the blank.

48. In a grinding machine for forming a milling cutter from a blank, the combination with a spindle for supporting the cutter blank, a slide for rotatably supporting the spindle, a main frame for supporting said blank slide, a rotating shaft mounted on said frame with its axis parallel to the line of movement of the slide, a bevel gear wheel mounted on said shaft to rotate therewith, connecting means between said gear wheel and the slide to effect movement of the gear wheel along the shaft in accordance with the movement of the slide, and a second bevel gear wheel mounted on the spindle and meshing with the first mentioned gear wheel, of means for effecting relieving movements of the blank and slide in timed relation to the blank rotation.

49. In a grinding machine for forming a milling cutter from a blank, the combination with a main frame, a grinding wheel cooperating with the cutter blank, and a slide for supporting said grinding wheel, of a shaft mounted on said main frame and having its axis located perpendicularly to the line of movement of said wheel slide, an auxiliary frame rotatably mounted on said shaft and supporting said wheel slide, a screw shaft mounted on said auxiliary frame, bevel gear wheels for connecting the screw shaft to said first mentioned shaft, means for threadably connecting the screw shaft to the wheel slide for effecting movement of the wheel slide relative to said auxiliary frame, and means for rotating said first mentioned shaft in timed relation to the blank rotation to effect feeding movements of the wheel relative to the blank.

50. In a grinding machine for forming a milling cutter from a blank, the combination with a main frame, a slide mounted on said main frame and rotatably supporting the cutter blank, a grinding wheel cooperating with the cutter blank, a slide for supporting the grinding wheel, a shaft mounted on said main frame and having its axis located perpendicularly to the line of movement of said wheel slide, an auxiliary frame pivotally mounted on said shaft and supporting said wheel slide, and a screw shaft mounted on the auxiliary frame, of bevel gear wheels for connecting the screw shaft to the first mentioned shaft, means for threadably connecting the screw shaft to the wheel slide for effecting movement of the wheel slide to move the wheel slide relative to the auxiliary slide, means for rotating said first mentioned shaft in timed relation to the blank rotation to effect feeding movements of the wheel relative to the blank, and means for effecting relieving movements of the blank and the blank slide relative to the wheel and in timed relation to the blank rotation.

In testimony whereof, we hereto affix our signatures.

WILLIAM C. F. SCHRAMM.
CARL SCHRAMM.